United States Patent
Pitou

(10) Patent No.: US 8,068,288 B1
(45) Date of Patent: Nov. 29, 2011

(54) THIN STEPPED TULIP LENS

(75) Inventor: David S Pitou, Santa Rosa, CA (US)

(73) Assignee: Triformix, Inc., Santa Rosa, CA (US)

( * ) Notice: Subject to any disclaimer, the term of this patent is extended or adjusted under 35 U.S.C. 154(b) by 0 days.

(21) Appl. No.: 12/560,318

(22) Filed: Sep. 15, 2009

Related U.S. Application Data

(60) Provisional application No. 61/097,097, filed on Sep. 15, 2008.

(51) Int. Cl.
  *G02B 9/08* (2006.01)
  *F21V 5/00* (2006.01)
(52) U.S. Cl. .......... 359/743; 362/327; 362/337
(58) Field of Classification Search .......... 359/726, 359/742, 743; 362/327, 333, 334, 335, 336, 362/337
See application file for complete search history.

(56) References Cited

U.S. PATENT DOCUMENTS 6,755,556 B2 * 6/2004 Gasquet et al. ............... 362/329

* cited by examiner

*Primary Examiner* — David N Spector
(74) *Attorney, Agent, or Firm* — Gary Hoenig

(57) ABSTRACT

A secondary illumination optic, principally directed toward managing light from light emitting diode illumination sources having a primary optical element, is provided comprising a lens combination arranged along the optical axis, a central convex lens portion being centrally positioned on the optical axis, and a surrounding total internal reflection lens portion, with the central optic having a first and incident surface and a second and exiting surface, both comprising refractive faceted optical lens elements, and the total internal reflection optic lens portion having a cylinder shaped aspheric first and incident surface, a second and internal total reflection surface, and a third and exiting surface comprising refractive faceted optic lens elements, wherein, being constructed of resin having optical characteristic, the central and total internal reflection lens portions are molded as an integrated assembly from an optical resin providing a stepped tulip type lens, thinner and higher yielding than prior art lenses.

8 Claims, 7 Drawing Sheets

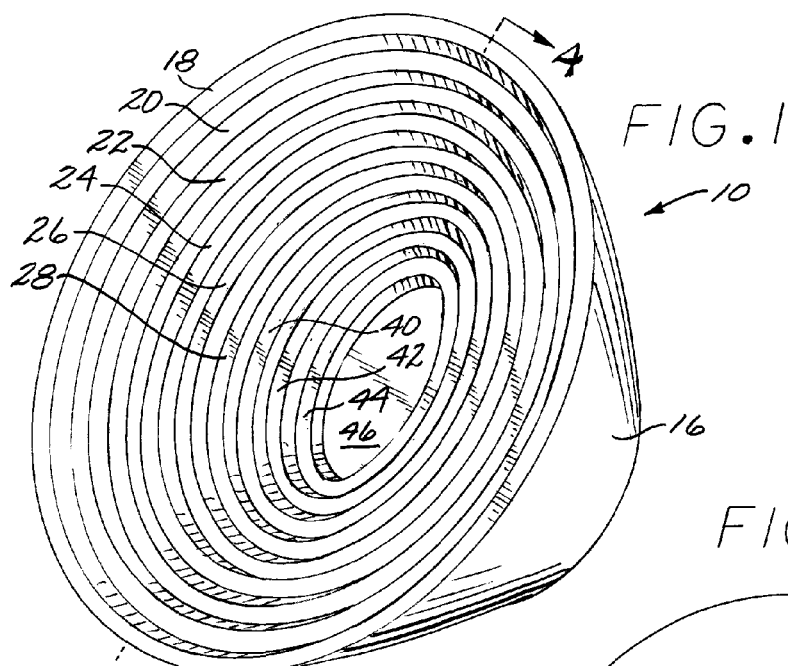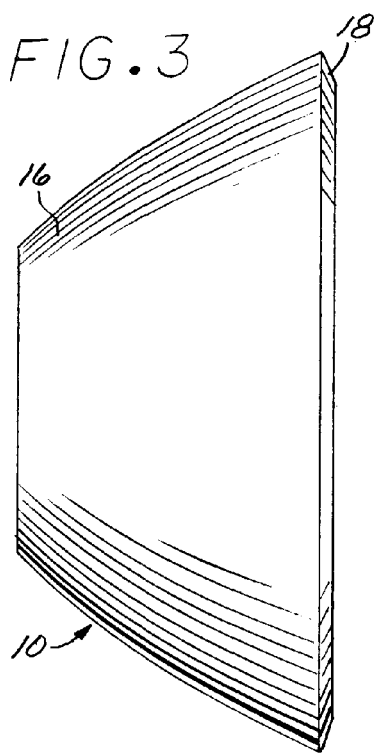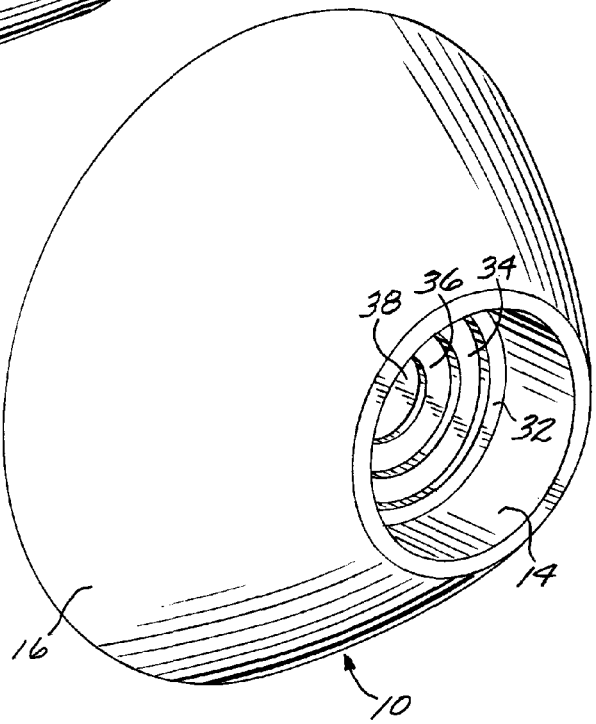

THIN STEPPED TULIP LENS

FIELD OF INVENTION

The present invention generally relates to the field of optical lenses; and, more particularly, to resin based optical elements used for point source light management including secondary illumination lenses utilizing multi-faceted element type optical surfaces.

BACKGROUND OF THE INVENTION

Managing the light flux from a light emitting diode (LED) source, typically being a point source, requires the use of a complex optical lens for gathering as much of the light emitted from the source as possible and redirecting the light to a surface to be illuminated in the far field in a predetermined illumination pattern. Maximizing the efficiency of an LED lighting system is measured, in part, by the amount of light successfully captured and usefully redirected by the optics to a far field object. A typical LED source has a primary resin optic molded around and encapsulating the semiconductor such that the light emitted from the source ideally behaves similar to a point source having a cosine-like distribution centrally peaking along or near the forward central axis of the source and declining to a minimum at 90 degrees from the central axis. So as to direct the light to a specific surface in the far field distal to the source, a secondary illumination optic is required. The secondary illumination optic is arranged to capture the light emitted from the LED primary optic and redirect or focus the light on a far field surface.

Light emitted near the peak of the light distribution is emitted from the LED primary optic at relatively small angles from the central lens axis is suitable for capture by a conventional convex optical lens secondary optic wherein a light ray impinging on the incident surface of the secondary optic is refracted through the lens, refracted again at the exiting surface and directed on to a far field target surface. Light emitted from the LED primary lens at higher angles from the central axis escaping capture by a centrally positioned convex optical element can be gathered and redirected by a further lens element axially surrounding and contiguous to the LED primary lens. Because this peripheral light is emitted at high angles, the peripheral lens is often in the form of a minor constructed to reflect the light forward and onward to the far field surface. Alternatively, a total internal reflection (TIR) lens is constructed around the LED primary lens wherein the light is captured by a lens having an aspheric incident surface, shaped similar to a cylinder, designed to direct light from the LED source to a circumferentially positioned lens surface at angles so as to produce internal reflection at the respectively designed circumferentially positioned lens surface thereby directing the light forward and out through an exiting surface designed to refract the light on to the far field surface. In the afore described manner, the light flux capture from the LED source is maximized as all light, regardless of the angle from the central axis, is captured by a lens surface, redirected and passed on to a far field surface. Manipulation of the lens design can further be adjusted to form desired patterns or distributions on a far field object.

The combination secondary illumination lens having a central and surrounding TIR optic is known as a tulip type lens. As the optical pathways of the central convex lens and the outer internal reflection lens elements provide separate and distinct ray pathways, the lenses may be formed together as an integrated tulip lens assembly forming the secondary illumination optic. In order to accomplish the optical characteristics afore described, the central optic and the TIR optic of a tulip lens tends to be thick. Further, because of the complex nature of the surfaces of a tulip lens, injection molded resin optic lens construction techniques are desirable; however, lens resin optics having large surface to surface thicknesses, as required in prior art tulip type lenses, present a number of serious disadvantages.

Generally the cost of manufacturing an injection molded tulip type secondary illumination optic is high principally due to the mold cycle time resulting from the length of time required to cool and set a thick lens to a temperature permitting the release of the lens from the mold. Further, thick lens designs require enhanced molding techniques so as to avoid material shrinkage or other temperature gradient induced deformities during the manufacturing process thereby reducing yield rates. Generally, the lens thickness, as measured between a mold surface and an opposing mold surface, should be minimized. Best yield rates and lowest mold cycle times are achieved with a thin and consistent mold surface to opposing mold surface resin thicknesses so as to provide minimal resin utilization, homogeneous and rapid cooling, and minimal material shrinkage. The benefits of consistent resin thicknesses are maximized when the thermal flux, during the mold cool down, from the resin, to the mold surfaces is homogeneous throughout molded lens as the lens cools, thereby providing homogeneous cooling minimizing residual resin distortion.

Although the tulip type combination lens design is ideally suited as a highly efficient secondary illumination optic for LED sources, the manufacturing constraints and costs render the design less competitive in a highly competitive market place. What is needed is an improved secondary illumination optics lens that is commensurate with injection resin optic molding techniques and manufacturable at lower costs and higher yields.

SUMMARY OF THE INVENTION

Accordingly, the present invention is directed to a resin based secondary illumination optics, and, more specifically, to a resin based combination lens similar to a tulip type lens having a thin construction, reduced material content, reduced manufacturing time, and improved yield rates principally intended for LED or other similar light source applications, thereby substantially obviating one or more of the problems due to the limitations and disadvantages of the related art.

The present invention, in one embodiment, is a secondary illumination optic lens comprising a combination of lenses arranged along the optical axis including a convex lens portion, being centrally positioned on the optical axis, and a surrounding total internal reflection lens portion, with the central optic having a refractive incident first surface and a refractive exiting second surface both first and second surfaces comprising faceted and non-faceted optical elements, and a total internal reflection optic portion having a refractive aspheric incident first surface, resembling a cylinder, an internal total reflection second surface, and a refractive exiting third surface comprising faceted optical elements, wherein, being constructed of polymer resin having optical characteristics, the lens portions are molded together as an integrated assembly from an optical resin polymer. The faceted optical elements of the refractive surfaces comprising such elements are annularly aligned around the optical axis being consecutively and contiguously arranged lens ring shaped segments of a convex type lens wherein in combination approximate the refractive optical characteristics of a single continuous lens surface. It is advantageous to segment a refractive optical surface into the faceted optical elements so as to facilitate a unique optical design of each individual element for purposes of reducing the distance between lens surfaces thereby reducing the lens thickness while maintaining the refractive optical characteristics of a continuous lens surface. Segmentation is required because as the distances between the lens surfaces are reduced, the pitch of the refractive lens surfaces, relative to the optical axis, increases thereby producing lens segments with an offset or step between each segment yielding a cross section appearance similar to a saw tooth or stepped pattern forming the faceted optical elements. Each faceted optical element therefore further comprises a refractive optical surface and a non-refractive surface, the later being present so as to provide the transition and connectivity between optical faceted elements. To minimize the optical influence of the non-refractive surface portion of each faceted optical element, this surface should be near to parallel with the optical axis and approximately in line with the light flux through the combination lens surface.

In combination, the various optical surfaces therefore provide tulip type lens performance having a thin construction and stepped surfaces yielding the thin stepped tulip lens of the present invention and the accompanying advantages over the prior art.

A primary objective of the present invention to minimize the thickness and to provide consistent surface to surface thicknesses throughout the lens is therefore accomplished by approximating the performance of a traditional tulip type secondary illumination optic by incorporating unique refractive faceted optical elements to replace selected refractive surfaces. The lens according to the present invention requires significantly less optical polymer resin, substantial reduction in mold cycle times, and improved yield rates as compared to production of traditional tulip type lenses.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 1 is a front perspective view of the thin stepped tulip lens according to the present invention showing the ring shaped segment features of the refractive faceted lens elements forming the second and exiting surface of the central convex lens portion and the third and exiting surface of the surrounding total internal reflection lens portion.

FIG. 2 is a rear perspective view of the present invention illustrated in FIG. 1, showing the second optical surface of the total internal reflection lens portion around the circumference, the first and incident surface of the total internal reflection lens element forming an internal aspheric surface, resembling a cylinder in shape, and the first and incident surface of the convex lens portion comprising ring shaped faceted lens elements.

FIG. 3 is a side elevation view of the present invention.

DETAILED DESCRIPTION OF THE PREFERRED EMBODIMENT

Figure 4:
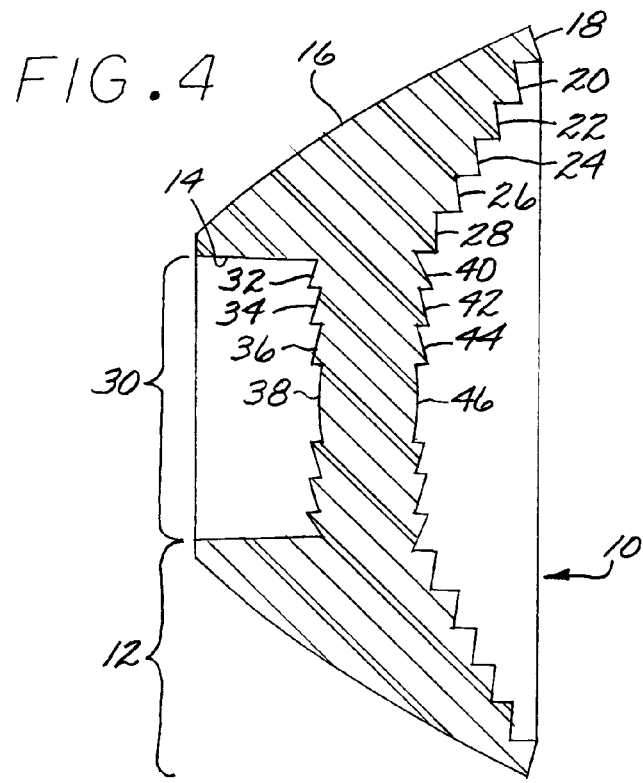
FIG. 4 is a sectional view the stepped tulip lens according to the present invention showing the faceted lens elements and the spatial relationship of the centrally located convex lens construct and the circumferentially positioned total internal reflection lens portion.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in a perspective view at 10 in FIG. 1, a new type of secondary illumination tulip type lens optic having a central lens optic portion and surround total internal reflection (TIR) lens optic portion utilizing refractive faceted optical elements in selected optical surfaces facilitating a thin and low mass design suitable for low cost and high yield manufacturing, particularly suitable for use as a secondary illumination optic for LEDs; however, the device is also suitable for other applications requiring similar optical and manufacturing characteristics.

The thin stepped tulip lens, according to the present invention, comprises a combination of a central lens optic portion 30 and a surrounding TIR lens portion 12 as illustrated in cross section if FIG. 4. The TIR lens comprises three optically active surfaces wherein the first lens surface being proximate to a light source refracts the collected light towards a second optically active surface presenting an angle relative to the light ray path from the first surface such that the path is reflected towards a third optically active surface providing refraction of the ray path and fashioned such that the ray paths exit the lens in a predetermined direction. Although the TIR third surface may be a continuous surface shaped so as to refract all ray paths directed from the reflective second surface, a continuous surface requires the third surface to extend forward and outwardly from the lens assembly in order to achieve a desirable refraction angle at the third surface thereby necessitating the lens central thickness to increase towards the central axis of the lens. It will be appreciated that additional lens thickness necessarily increases the resin required to form the lens and more significantly increases the difficulty to manufacture such a lens due to increased cycle times during the molding process as well as the increase probability of unintentionally form defects in the mold surfaces. According to the present invention the third surface of the TIR is formed by a series of faceted optical lens elements forming annularly arranged rings around the central lens optic and replacing a continuous lens surface providing optical ray path refractive characteristics so as to direct exiting rays to the same or similar locations at a distant target and provide similar or equivalent illumination as a continuous surface optic. The thickness of the central lens portion 30, is similarly reduced by utilizing similar faceted optical lens elements in both the first and incident, and second and exiting surfaces replacing the continuous surface shapes of the prior art lens while approximating the optical performance of prior art lenses.

The perspective frontal view of the present invention shown at 10 in FIG. 1, showing the thin stepped tulip lens according to the present invention comprising in combination the central convex lens axially surrounded by the total internal reflection optic portion. In FIG. 1, the refractive second and exiting optical surface of the central convex lens portion is comprising faceted lens elements 40, 42 and 44 and central non-faceted lens element 46 and the third and exiting optical surface of the surrounding TIR optical lens portion comprising faceted lens elements 18, 20, 22, 24, 26 and 28. The second and reflecting surface of the TIR optical lens portion is indicated at 16, while the first and incident surface is shown at 14. Also shown are the faceted elements 32, 34 and 36, and a non-faceted central element 38 comprising the first and incident optical surface of the centrally positioned convex lens portion.

The side elevation view of the present invention shown in FIG. 3, illustrates the second and reflecting optical surface of the TIR portion with the first faceted optical element 18 of the third and exiting surface of the TIR visible in this view.

Figure 5:
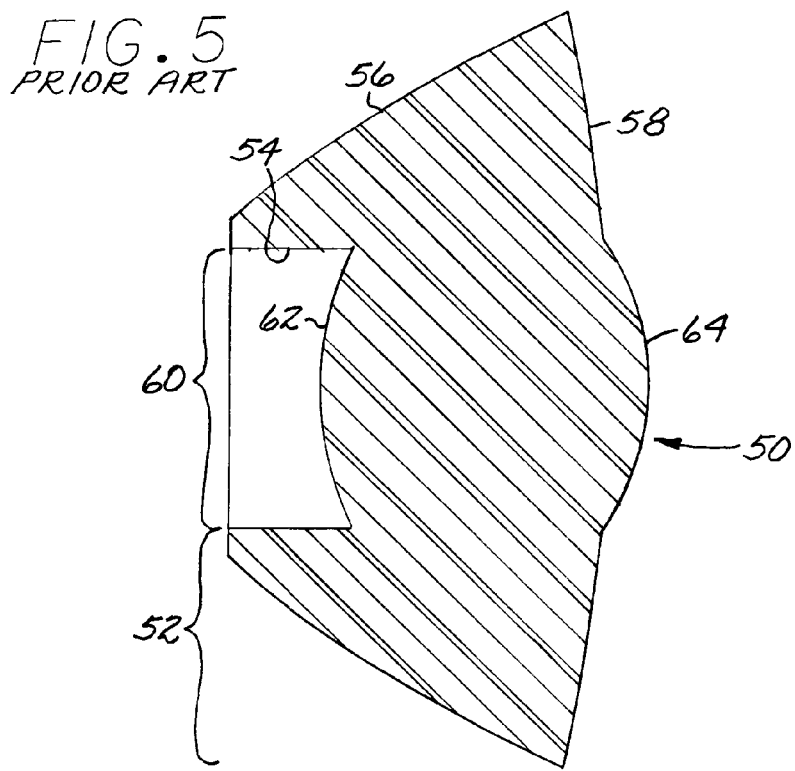
FIG. 5 is the cross section view taken along the optical axis of a prior art tulip lens for purposes of illustrating the prior art lens thickness and material requirements for comparison with the thin stepped tulip lens of the present invention.

Referring now to FIG. 4 showing a cross section view through the central optical axis of the lens, details of the lens construction are visible wherein a central convex lens portion 30 is surrounded by a TIR lens portion 12. The incident and exiting surfaces of the central convex lens portion, as noted at 30, comprise a number of faceted optical elements and a central non-faceted lens element so designed to approximate the refractive optical characteristics of a prior art lens as illustrated in FIG. 5. For comparison, a prior art tulip type lens is shown in FIG. 5 at 50. The optical performance of the refractive incident optical surface 62 of the prior art lens central convex optic lens portion at 60 in FIG. 5, is approximated by the combination of the optical performance of the faceted elements 32, 34 and 36 and the non-faceted element 38. Similarly, the optical performance of the refractive exiting optical surface 64 of the prior art lens 50 is approximated by the combination of faceted elements 40, 42, and 44 and non-faceted element 46 of the present invention 10 in FIG. 4. The optical surfaces are designed to direct light output from a LED primary optic source to produce a specific output pattern in the far field. The lens, therefore, comprises two distinct optical pathways which are overlaid and in combination achieve the final desired pattern in the far field.

The TIR lens portion 12 in FIG. 4, comprises a conventional aspheric first and incident surface 14, resembling a cylinder in shape, and reflective surface 16 of a prior art lens 50 surfaces 54 and 56 respectively. However, the third and exiting surface comprises faceted elements 18, 20, 22, 24, 26 and 28, so engineered as to approximate the optical performance of the third and exiting TIR lens portion surface 58 of the prior art lens 50 in FIG. 5.

Figure 6:
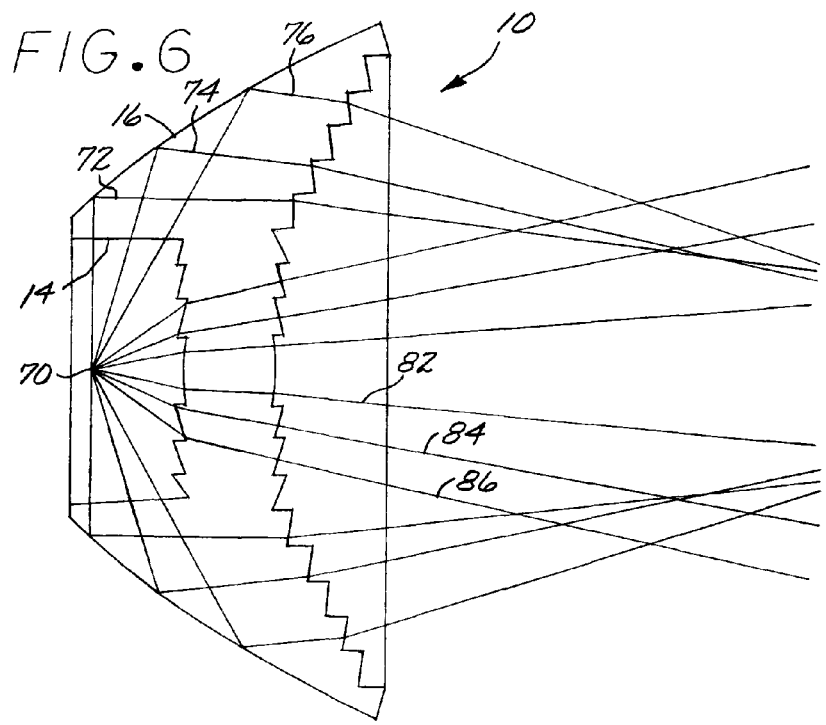
FIG. 6 is the cross section view, similar to FIG. 4, further showing exemplar ray trace pathways of light from a point source through the thin stepped tulip lens according to the present invention.
Figure 7:
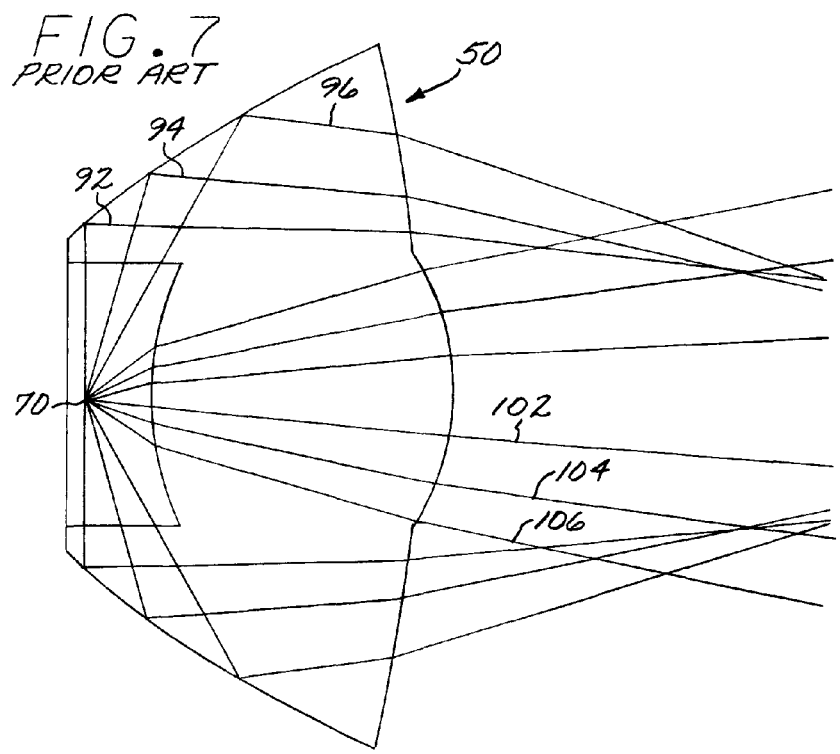
FIG. 7 is a cross section view, similar to FIG. 5, further showing exemplar ray trace pathways of light from a point source through a prior art tulip lens for purposes of comparison with the light management features of the present invention.

The light ray trace pathways through the thin stepped tulip lens are similar to prior art tulip lens designs and are similarly exclusively segregated between the total internal reflection lens and central lens portions. Exemplar light ray traces from a point source 70, indicating for comparison the optical characteristics of the present invention and the prior art lenses, are illustrated in FIGS. 6 and 7 wherein the lens according to the present invention is shown at 10 in FIG. 6 and the prior art lens is shown at 50 in FIG. 7. Note, in particular, the ray traces 82, 84 and 86, in FIG. 6, representing the ray trace pathways through the central convex lens portion having approximately the same pathways emerging from the exiting surface and on to the far field as the corresponding ray traces 102, 104 and 106 of the prior art lens in FIG. 7. Similarly, the ray traces 72, 74 and 76 through the lens according to the invention yield similar exiting surface pathways on to the far field through the TIR lens portion as compared to the respective prior art pathways 92, 94 and 96.

Each faceted optical lens element is a ring shaped segment of a refractive lens with a refractive surface providing a surface having a refractive optical characteristic through which the ray traces travel, and a non-refractive surface providing structure between the faceted elements with the surface arranged to be close to parallel with the ray traces so as to minimize interaction with the ray traces. The annular width of each element may vary as required to create a particular optical characteristic of the particular element.

Although the preferred embodiment as illustrated in the figures is shown to comprise three faceted lens elements and a non-faceted lens element for incident and exiting surfaces of the central convex optic and six faceted elements comprising the exiting surface of the TIR lens portion, the number of faceted elements in any of the surfaces may vary depending upon the physical constraints of manufacturing and the desired far field illumination pattern. In particular, it will be appreciated that the non-refractive surfaces provided for structural continuity must be angled outward relative to the optical axis so as to allow release from a mold. This release angle is known as the draft of the surface and is typically required to be approximately 2 degrees. An example non-refractive surface of a faceted element is indicated at 112 in FIG. 4. Consequently, the total number of non-refractive surfaces ideally should be minimized as each of these surfaces contributes a small amount of interference with the ray pathways thereby reducing the optical performance of the combined surface. Minimizing the number of faceted elements is limited by the thickness requirements as the thickness increases with the fewer number of faceted elements. The optimum number of faceted elements therefore is principally a function of the desired thermal characteristics of the finished optic wherein a consistent surface to surface distance is desirable to provide homogeneous cooling in the mold.

Figure 8:
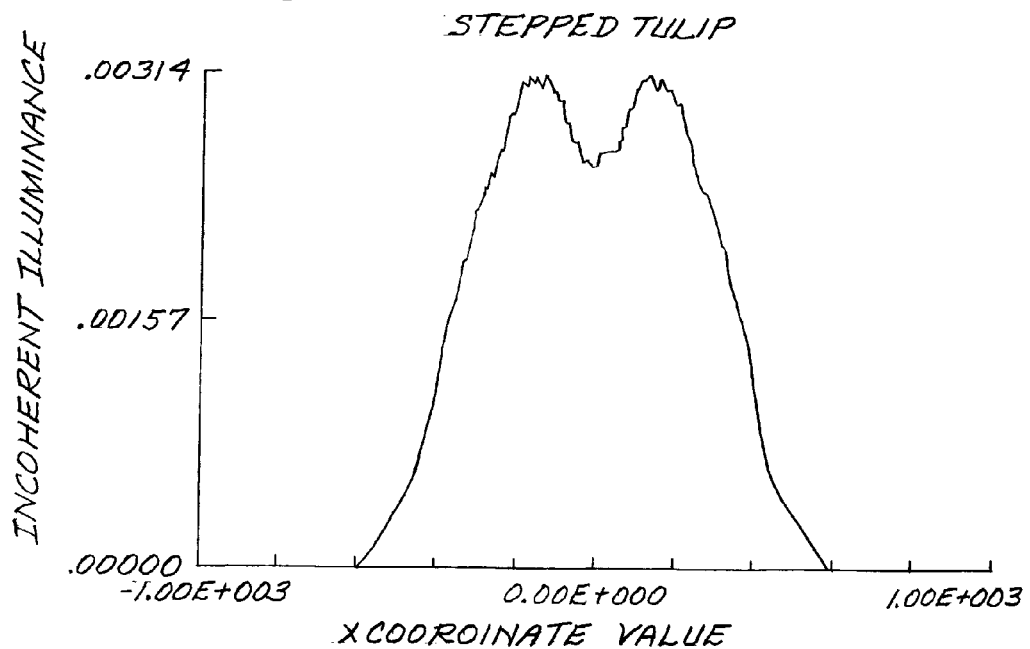
FIG. 8 is a diagram showing the far field illuminance of the thin stepped tulip lens according to the present invention relative to the central optical axis of the combination lens.
Figure 9:
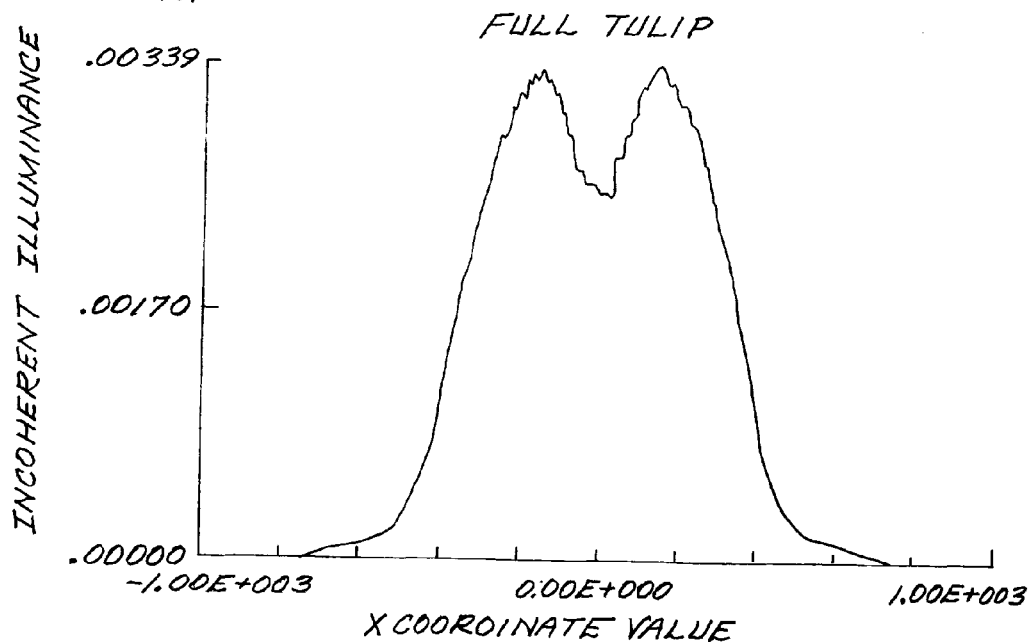
FIG. 9 is a diagram show the far field illuminance of the prior art tulip-like lens of FIGS. 5 and 7 relative to the central optical axis, illustrating the similarity of performance to the thin stepped tulip lens according to the present invention.

As presented in FIG. 8, the far field incoherent illuminance is graphed against the x-axis distance from the central axis of the stepped thin tulip lens according to the present invention. Similarly, in FIG. 9, the far field incoherent illuminance is graphed against the x-axis distance of a prior art tulip lens. It will be appreciated that, notwithstanding the significantly reduced resin content and lens surface elements, the illumination performance of the stepped thin tulip lens is roughly equivalent to the performance of prior art tulip type lenses shown in FIG. 9. Further, in far field illumination applications, tests have indicated that differences in the user perceived far field illumination is indistinguishable. Consequently, the new lens is suitable as a direct replacement for prior art tulip type lenses while providing the aforedescribed manufacturing and cost advantages.

Figure 10:
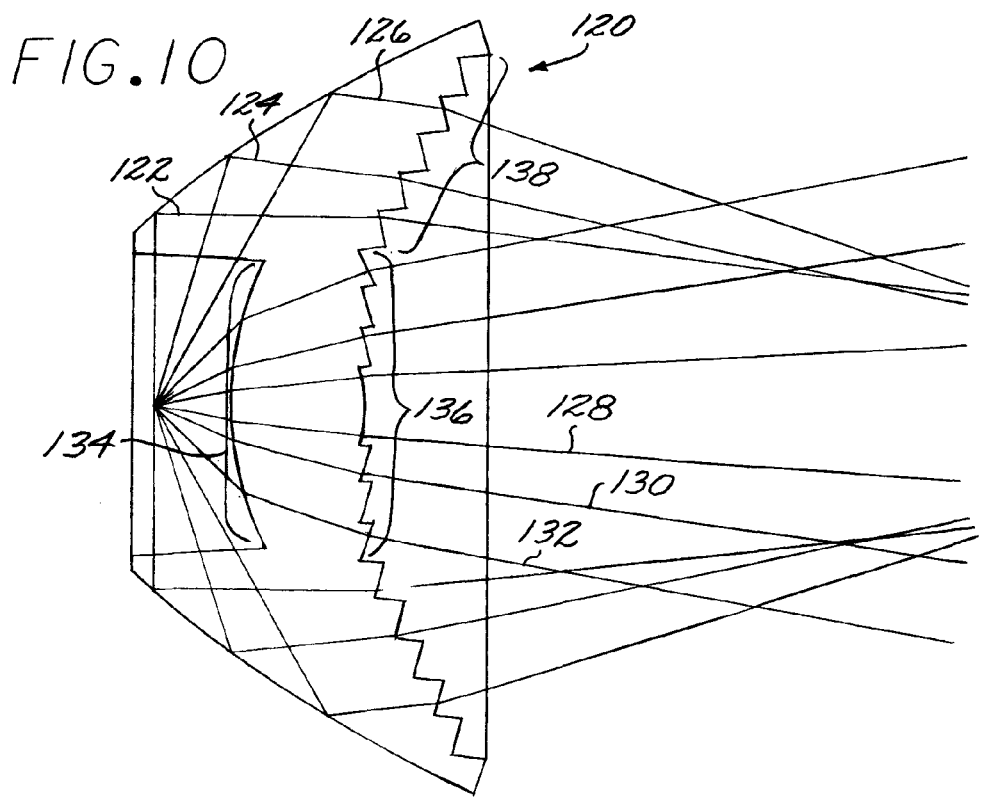
FIG. 10 is a cross section view of a first alternate embodiment of the stepped tulip lens according to the present invention wherein only the exiting surfaces comprising faceted elements showing exemplary ray trace pathways of light from a point source.

Other alternative embodiments of the thin stepped tulip lens comprise various combinations of faceted lens surfaces as required so as to achieve the overall lens optic performance and thicknesses desired. For example, referring to FIG. 10, showing a first alternate embodiment at 120, the incident surface of the central lens portion at 134 is constructed without facets while the exiting surface 136 is faceted as well as the exiting surface 138 of the total internal reflection lens portion are both constructed of faceted elements. The light ray paths 122, 124, and 126 through the total internal reflection portion of the lens are unaffected by the continuous lens surface 134 providing an optical performance similar to a tulip lens having a faceted incident surface of the central lens portion. The light ray paths 128, 130, and 132 are refracted by the, now continuous incident surface 134 and the exiting surface 136 of the central lens portion. Selected optical performances require a continuous incident surface of the central lens portion and hence are a desirable embodiment.

Figure 11:
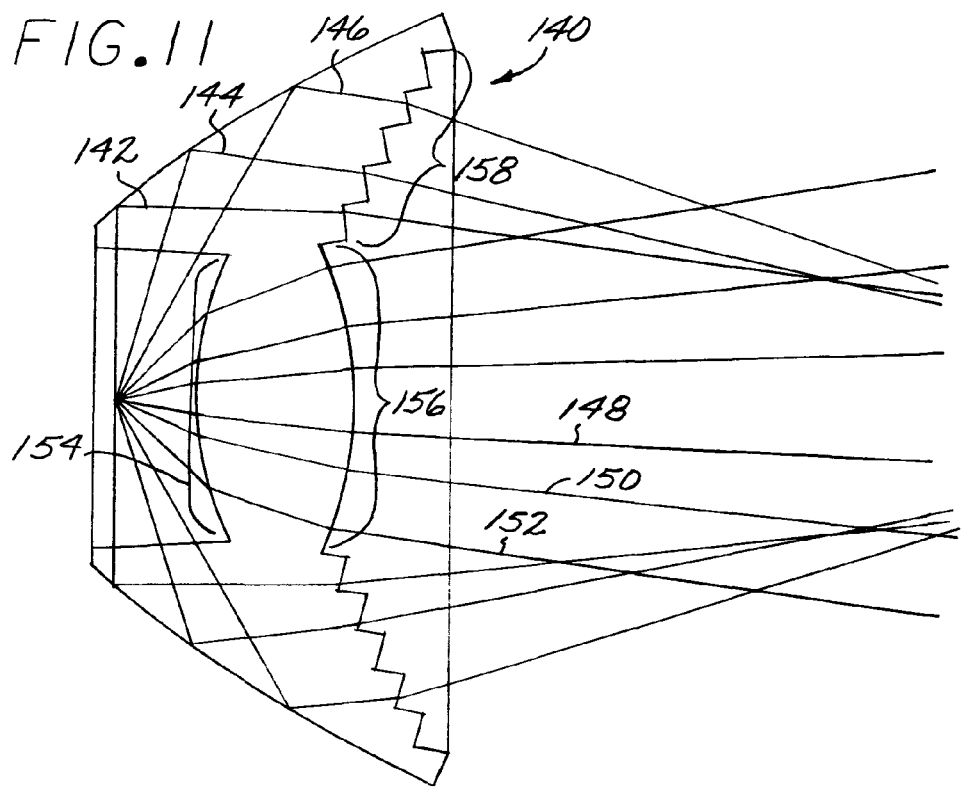
FIG. 11 is a cross section view of a second alternate embodiment according to the present invention showing exemplar ray trace pathways of light from a point source wherein only the exiting surface of the total internal reflection lens portion is comprising faceted lens elements.

Hence, further embodiments include various other combinations of faceted and continuous lens surfaces so as to also achieve desired optical performance, lens thickness and optimal lens material usage such as illustrated at 140 in FIG. 11 wherein a further embodiment comprises a central lens portion having incident surface 154 and exiting surface 156 being continuous and non-faceted, and having only the exiting surface 158 of the total internal reflection portion being faceted. Central lens portion exemplar light ray paths 148, 150 and 152 are refracted according to the continuous incident and exiting surfaces. Similarly, light ray paths 142, 144, and 146, through the total internal reflection portion, are refracted upon exiting by a faceted surface 158.

Figure 12:
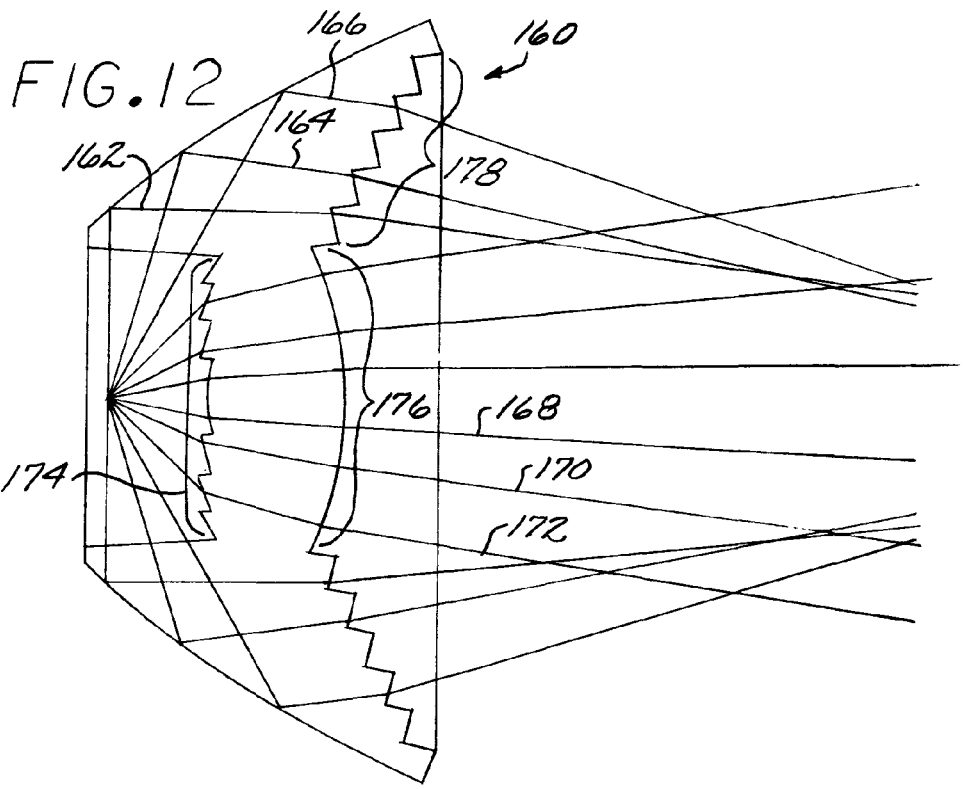
FIG. 12 is a cross section view of a third alternate embodiment of the present invention having the incident surface of the central lens portion comprising faceted lens elements and the exiting surface of the total internal reflection lens portion also comprising faceted lens elements, showing exemplar ray trace pathways of light from a point source.

It will be appreciated that any combination of the exiting surfaces or the incident surface of the central lens portion may be faceted. If none of the surfaces are faceted, the resultant lens would represent a conventional prior art tulip type lens. Therefore, as illustrated in FIG. 12 at 160, an embodiment can comprise a faceted incident surface 174 of the central lens portion, a non-faceted exiting surface 176 of the central lens portion and a faceted exiting surface 178 of the total internal reflection lens portion with the corresponding example light ray paths 162, 164, and 166 through the total internal refection portion and example light ray paths 168, 170, and 172 through the central lens portion.

Figure 13:
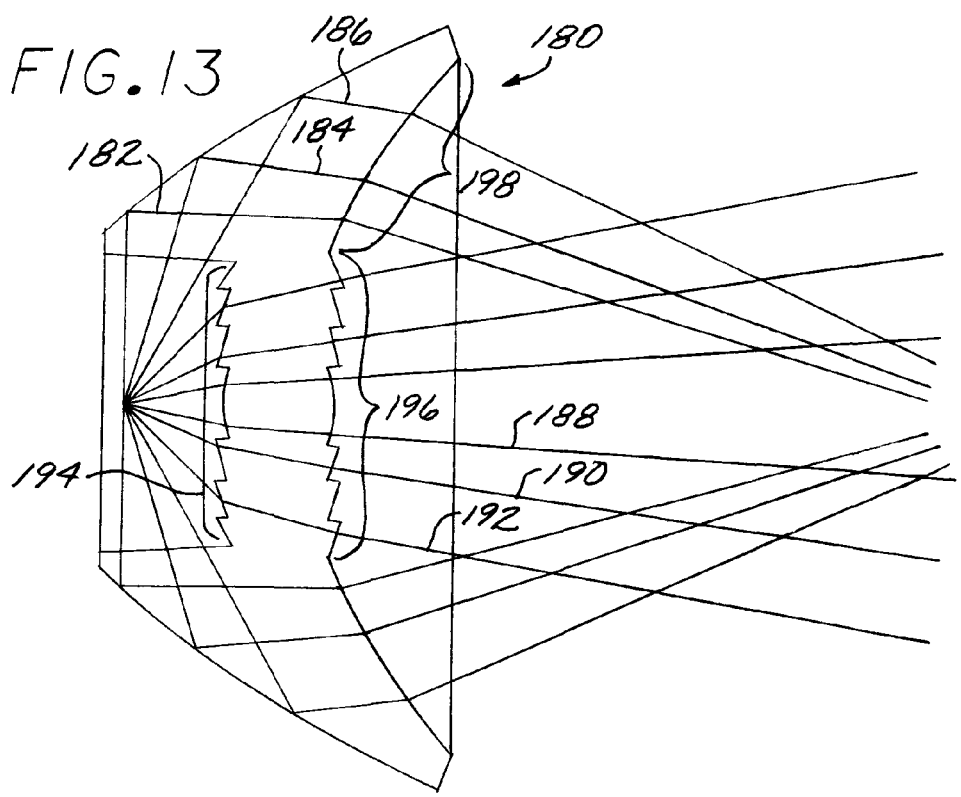
FIG. 13 is a cross section view of a fourth alternate embodiment according to the present invention showing exemplar ray trace pathways from a point source wherein only the incident and exiting surfaces of the central lens portion are comprising faceted lens elements.

A further embodiment, shown at 180 in FIG. 13, comprises a central lens portion having faceted incident 194 and exiting 196 surfaces, and a continuous, non-faceted exiting surface 198 of the total internal reflection lens portion. Similar to other embodiments, the light paths 182, 184, and 186 through the total internal lens portion and 188, 190, and 192 through the central portion are responsive, in part, to the refractive optical characteristics of the respective incident and exiting surfaces.

Figure 14:
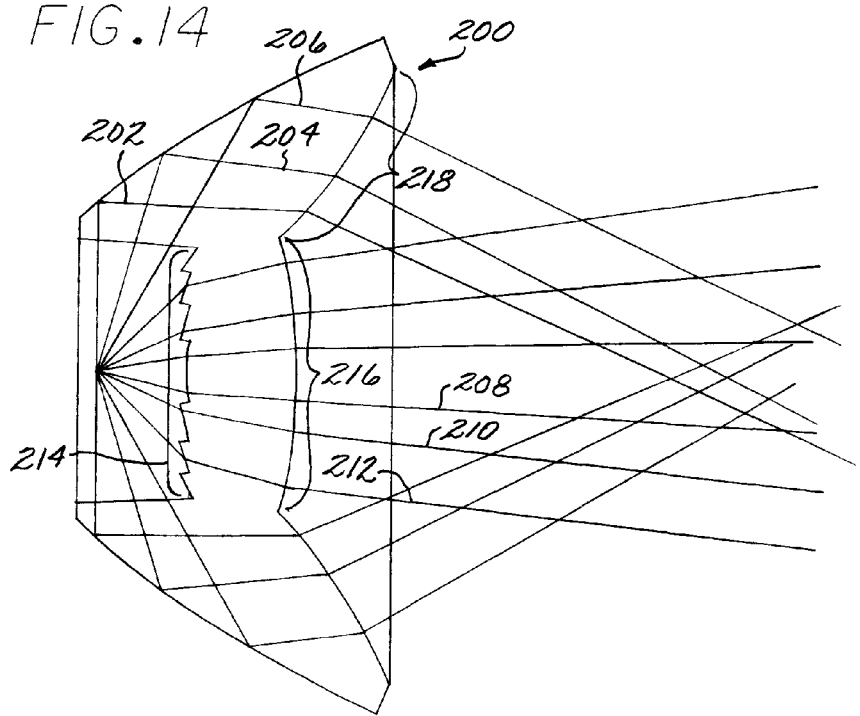
FIG. 14 is a cross section view of a fifth alternate embodiment of the present invention having the incident surface of the central lens portion comprising faceted lens elements, showing exemplar ray trace pathways of light from a point source.
Figure 15:
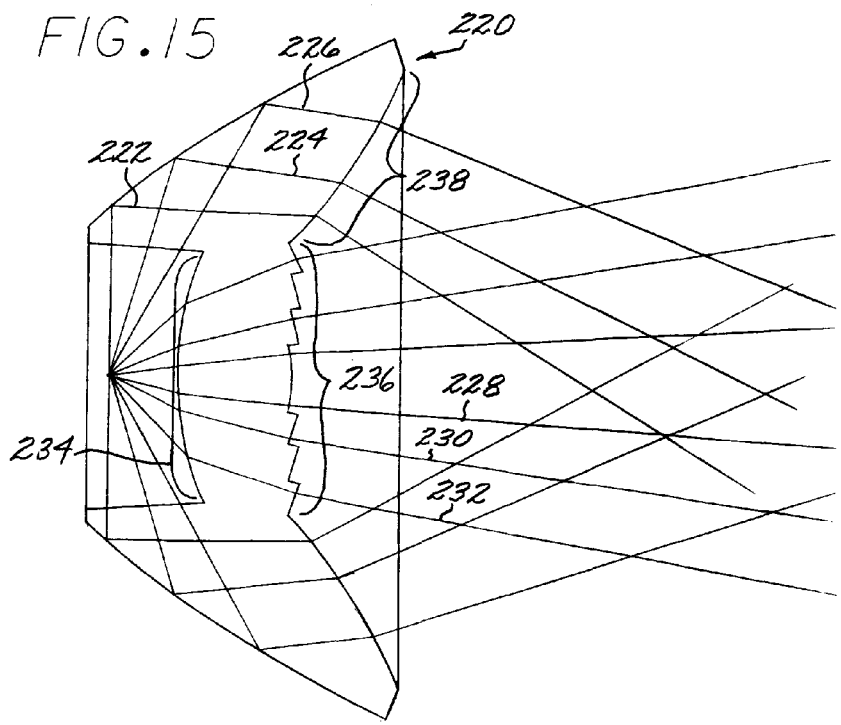
FIG. 15 is a cross section view of a sixth alternate embodiment of the present invention having the exiting surface of the central lens portion comprising faceted lens elements, showing exemplar ray trace pathways of light from a point source.

Further embodiments may comprise only one lens portion surface faceted. The embodiment, as shown at 200 in FIG. 14, has only the incident surface 214 of the central lens portion faceted with the exiting surface 216 of the central lens portion non-faceted. The exiting surface 218 of the total internal reflection lens portion is also non-faceted. Also similar to other embodiments, the light paths 202, 204, and 206 through the total internal lens portion and 208, 210, and 212 through the central portion are responsive, in part, to the refractive optical characteristics of the respective incident and exiting surfaces. The embodiment, as shown at 220 in FIG. 15, has only the exiting surface 236 of the central lens portion faceted with the incident surface 234 of the central lens portion non-faceted. The exiting surface 238 of the total internal reflection lens portion is also non-faceted. In the embodiment at 220, the light paths 222, 224, and 226 through the total internal lens portion and 228, 230, and 232 through the central portion are responsive, in part, to the refractive optical characteristics of the respective incident and exiting surfaces.

It will be appreciated that any of the continuous surfaces of any of the lens portions may be convex, concave, or any other optical surface design as required to achieve a desired overall optical performance of the thin stepped tulip lens. Similarly, the lens elements in the faceted surfaces may similarly be of any suitable optical design and need not be of all the same type or design within any one lens surface.

For example, the TIR pathway entrance surface, being the first and incident surface 14, as in FIG. 4, is any suitable optical surface including, but not limited to, a cylindrical, conical, spherical, or even or odd order asphere optical surface. The TIR surface, being the reflective surface 16, may also be any suitable optical surface design including, but not limited to, a spherical, conical, conic, or even or odd order asphere optical surface. The TIR pathway exit surface, when faceted, being the faceted elements 18, 20, 22, 24, 26 and 28 may be individually or collectively any suitable form of refractive surface including, but not limited to, an approximation to a spherical, conic, or even or odd order asphere optical surface. The optical surfaces need not be uniform particularly when a patterned far field distribution is required necessitating further manipulation of the optical surfaces to yield the desired illumination pattern in the far field. Similarly, the central lens portion incident and exiting surface designs may be, but not limited to, spherical, conic, or even or odd order asphere optical surfaces in either the non-faceted form or the faceted approximation form.

Any material having the desired refractive and manufacturing qualities for a particular application may be used to construct the lens. It will be appreciated that although an object of the invention is to facilitate molding of lens typically requiring a resinous material, the invention may also be manufactured by machining processes that can require other materials such as glass or metal. The material must also possess refractive qualities commensurate with the lens surface design and frequency requirements of a particular application. Therefore, the material selection, in part, is dependent upon the optical characteristics of the material to suit a particular application.

What is claimed is:

1. A thin stepped tulip type lens comprising, in combination, a central lens portion having an optical axis, an incident first surface having a plurality of faceted refractive elements and an exiting second surface; and, a total internal reflection lens portion surrounding the central lens portion having an optical axis positioned on the central lens portion optical axis and having a refractive aspheric incident first surface, resembling a cylinder, an internal total reflection second surface, and a refractive exiting third surface.

2. The thin stepped tulip style lens of claim 1 wherein the central lens portion and the total internal reflection lens portion are molded as an integrated and contiguous assembly.

3. The thin stepped tulip type lens according to claim 1, wherein the exiting third surface of the total internal reflection lens portion is further comprising a plurality of faceted refractive elements.

4. The thin stepped tulip type lens according to claim 1, wherein the central lens portion and total internal reflection lens portion are constructed from resin having optical characteristics.

5. The thin stepped tulip type lens according to claim 1, wherein the central lens portion and total internal reflection lens portion are constructed from glass.

6. The thin stepped tulip type lens according to claim 1, wherein the exiting second surface of the central lens portion is further comprising a plurality of faceted refractive elements.

7. The thin stepped tulip type lens according to claim 6, wherein the exiting third surface of the total internal reflection lens portion is further comprising a plurality of faceted refractive elements.

8. A thin stepped tulip type lens comprising, in combination, a central lens portion having an optical axis, an incident first surface having a plurality of faceted refractive elements and an exiting second surface having a plurality of faceted refractive elements; and, a total internal reflection lens portion surrounding the central lens portion having an optical axis positioned on the central lens portion optical axis and having a refractive aspheric incident first surface, resembling a cylinder, an internal total reflection second surface having a plurality of faceted refractive elements, and a refractive exiting third surface having a plurality of faceted refractive elements.

\* \* \* \* \*